United States Patent
Giacobbe

(10) Patent No.: US 7,874,828 B2
(45) Date of Patent: Jan. 25, 2011

(54) MACHINE FOR MOULDING PLASTIC CONTAINERS USING MEANS FOR MOVING THE MOULD-SUPPORT UNIT COMPRISING TWO IN-LINE CONNECTING RODS

(75) Inventor: Ferruccio Giacobbe, Carate Brianza (IT)

(73) Assignee: Magic MP S.p.A., Carate Brianza (IT)

( * ) Notice: Subject to any disclaimer, the term of this patent is extended or adjusted under 35 U.S.C. 154(b) by 504 days.

(21) Appl. No.: 11/872,991

(22) Filed: Oct. 16, 2007

(65) Prior Publication Data

US 2008/0152746 A1 Jun. 26, 2008

(30) Foreign Application Priority Data

Oct. 16, 2006 (IT) .......................... MI2006A1982

(51) Int. Cl.
*B29C 49/04* (2006.01)
*B29C 49/32* (2006.01)
*B29C 49/56* (2006.01)

(52) U.S. Cl. .......................... 425/193; 425/532; 425/541

(58) Field of Classification Search ................. 425/532, 425/541, 182, 193
See application file for complete search history.

(56) References Cited

U.S. PATENT DOCUMENTS

| 3,277,534 A | * | 10/1966 | McDonald et al. | ........... | 425/541 |
| 3,964,852 A | * | 6/1976 | Marfiewicz | .................. | 425/541 |
| 4,421,472 A | * | 12/1983 | Martin, Jr. | ................... | 425/527 |
| 4,673,076 A | * | 6/1987 | Mattson | .................... | 198/346.2 |
| 5,478,229 A | * | 12/1995 | Kato et al. | ................... | 425/529 |
| 6,102,685 A | * | 8/2000 | Miura et al. | ................. | 425/193 |
| 6,499,988 B1 | * | 12/2002 | Miura et al. | ................. | 425/532 |
| 6,884,059 B2 | * | 4/2005 | Giacobbe | ................ | 425/192 R |

FOREIGN PATENT DOCUMENTS

| DE | 4402091 A1 | 8/1994 |
| EP | 1306193 A2 | 5/2003 |
| JP | 11286043 A | 10/1999 |

OTHER PUBLICATIONS

Partial machine translation of JP-1128603-A dated Oct. 1999 obtained from the JPO website.*

* cited by examiner

*Primary Examiner*—Robert B Davis
(74) *Attorney, Agent, or Firm*—Mintz Levin Cohn Ferris Glovsky and Popeo, PC

(57) ABSTRACT

A machine for molding containers, comprising a unit for extruding plastic tubes, a blow-molding unit, a mold for containing containers which is formed by two half-molds movable, upon operation of associated first actuator, in a longitudinal direction (X-X) and symmetrically with respect to a fixed axis (Z-Z) perpendicular to said longitudinal direction, the unit formed by the mold and by the associated first actuator being movable, upon operation of second actuator, in a transverse direction (Y-Y) from a first position where it is substantially aligned with the extrusion unit into a second position where it is substantially aligned with the blow-molding unit and vice versa, said first actuator for operating the half-molds in the longitudinal direction comprising at least one motor, the shaft of which has, keyed thereon, a cam for actuating a pair of connecting rods which are arranged in-line and are respectively connected to the first half-mold and to the second half-mold.

15 Claims, 2 Drawing Sheets

MACHINE FOR MOULDING PLASTIC CONTAINERS USING MEANS FOR MOVING THE MOULD-SUPPORT UNIT COMPRISING TWO IN-LINE CONNECTING RODS

BACKGROUND

The present invention relates to a machine for blow-moulding plastic containers, provided with a motor device and two in-line connecting rods for opening/closing the mould.

It is known in the technical sector relating to the packaging of liquid products and the like that there exists the need to produce containers made of plastic suitable for this purpose.

It is also known that said containers are formed in suitable blow-moulding machines provided with associated moulds (composed of two half-moulds movable so as to open/close) into which a tube made of plastic extruded upstream of the mould is introduced and blow-moulded.

Also known are machines for moulding plastic containers comprising a unit for extruding plastic tubes, a blow-moulding unit and a mould for containing the containers which is formed by two half-moulds movable, upon operation of associated first means, in a longitudinal direction and symmetrically with respect to a fixed axis perpendicular to said longitudinal direction, the entire unit formed by the mould and the associated first operating means being movable, upon operation of associated second operating means, in a transverse direction from a first position, corresponding to positioning of the mould below the extrusion unit, to a second position corresponding to positioning of the mould below the blow-moulding unit, and vice versa, the first means for opening/closing the two half-moulds comprising at least one oil-hydraulic cylinder arranged parallel to the longitudinal axis and integral with a plate displaceable with a translatory movement.

Although fulfilling their function, these machines nevertheless have certain drawbacks essentially arising from the need to provide pipes for supplying the oil to the cylinder for operating the moulds, resulting in the possibility of leakages or contamination affecting the environment surrounding the machine.

IT 1,326,664 in the name of the same present applicants also discloses a machine in which said first means for operating the half-moulds are of the electrical type; this solution, however, proves to be particularly complicated owing to the large number of mechanical parts for the transmission of the reverse movement to the two half-moulds, which may give rise to play and therefore lack of precision in the closing symmetry of the two half-moulds.

In addition to this, the mechanical transmissions of conventional machines are the cause of vibrations which do not allow precise centering of the seats of the mould with the blowing-moulding injectors, particularly in the case of multiple heads where centering is correct only for some of them, while the remaining heads are off-centre with respect to the corresponding injector, resulting in a large number of production rejects.

SUMMARY

The technical problem which is posed, therefore, is to provide a machine for blowing-moulding plastic containers from extruded tubes, which provides a solution to the problems of the prior art described above and is able to allow easy and rapid adaptation thereof to variations in the format of the mould and/or the interaxial distance of the extruded tubes to be blow-moulded, without the need for a substantial transformation of the base machine.

In connection with this problem it is also required that this machine should be able to ensure correct relative centering of the injector/mould also in the case of multiple heads and allow perfect closing of the two half-moulds parallel to the axis of the extruded tube; it should also be composed of a small number of parts, being compact and easy to assemble, with easy access to the various parts, and permit a substantial reduction in the normal maintenance operations.

These results are achieved according to the present invention by a machine for moulding containers according to the characteristic features of claim 1.

Further details may be obtained from the following description of a non-limiting example of embodiment of the subject of the present invention, provided with reference to the accompanying drawings in which:

BRIEF DESCRIPTION OF THE FIGURES

Further details may be obtained from the following description of a non-limiting example of embodiment of the subject of the present invention provided with reference to the accompanying drawings in which.

DETAILED DESCRIPTION OF PREFERRED EMBODIMENTS

Figure 1:
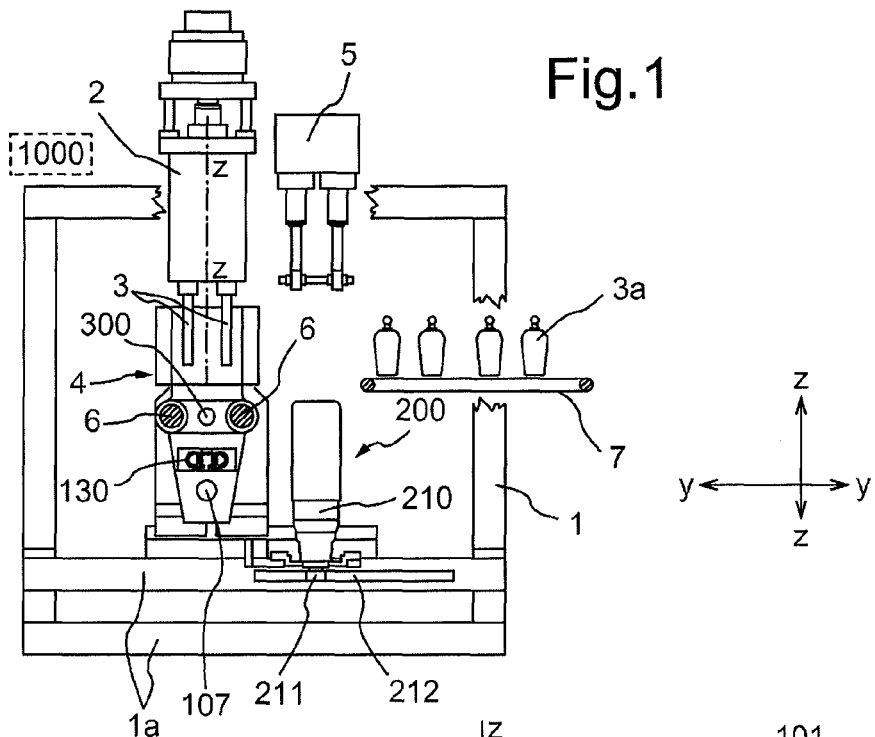
FIG. 1 is a schematic front view of the machine according to the invention during take-up of the extruded tubes.

As shown in FIGS. 1-6, the machine according to the invention includes a support frame comprising uprights 1 and cross-members 1a to which the extruding device 2 for extruding the plastic tube 3, the first actuator 100 for opening and closing the mould 4 in the longitudinal direction X-X, the second actuator 200 for moving the mould 4 in the transverse direction Y-Y, the blow-moulding nozzles 5 and the conveyor 7 for conveying away the moulded containers 3a are attached.

The mould 4 can be formed by two half-moulds 4a, 4b which are symmetrically arranged with respect to a fixed reference axis of symmetry Z-Z and are integral with respective flanges 14a, 14b mounted on a pair of guides 6 with a circular cross-section connected to the structure 1 by means of the support flanges 11 which are in turn integral with guides 12 slideable on rails 13 fixed to the frame 1.

Figure 2:
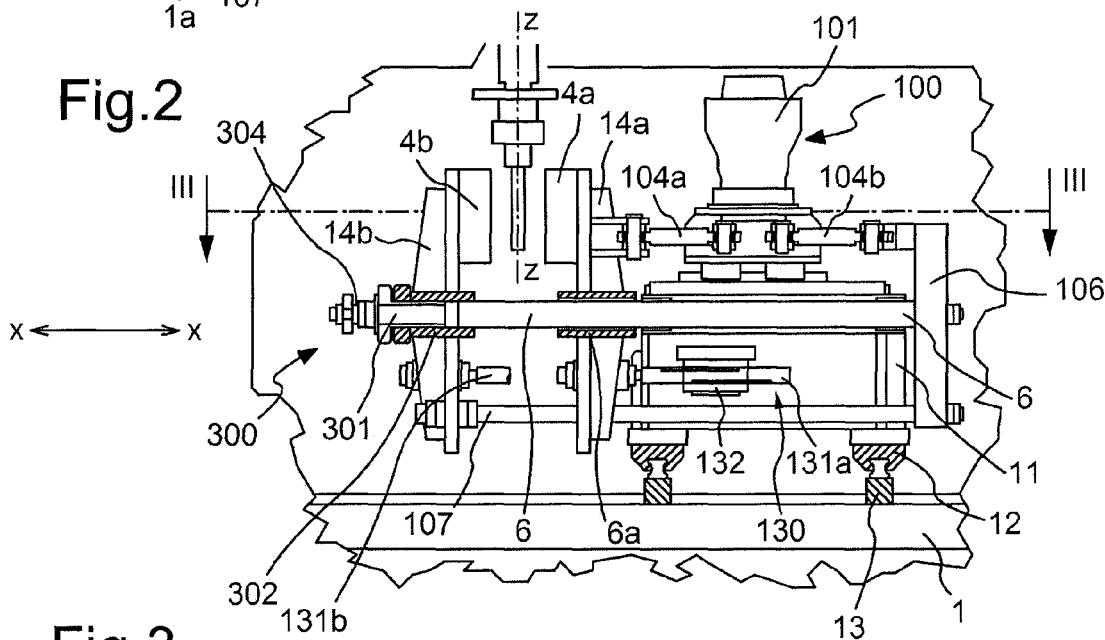
FIG. 2 shows a partially sectioned side view of the machine according to FIG. 1 with the mould open.
Figure 3:
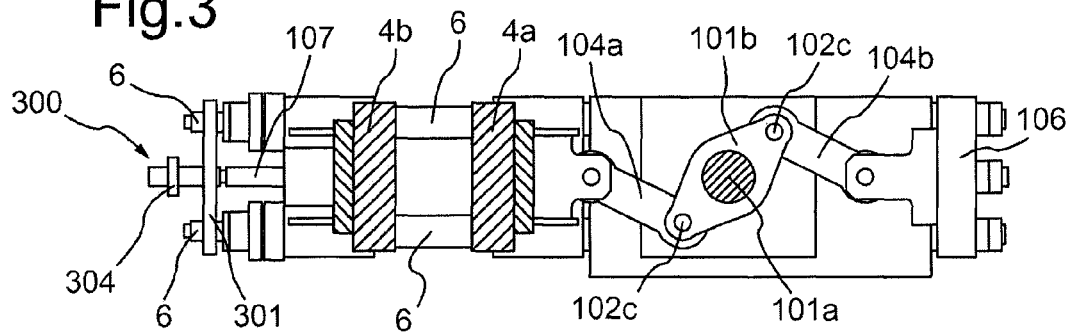
FIG. 3 shows a partial schematic cross-section through the machine along the plane indicated by the line III-III in FIG. 2.
Figure 4:
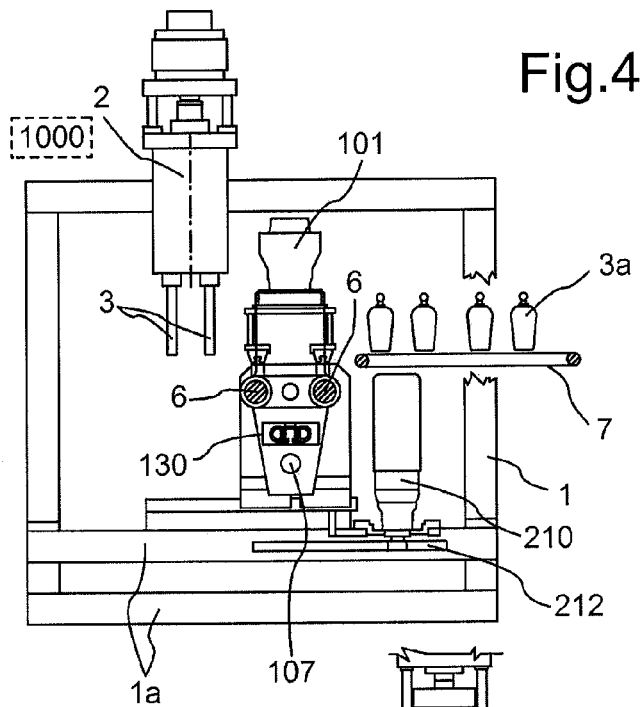
FIG. 4 shows a schematic front view of the machine according to the invention during blow-moulding.
Figure 5:
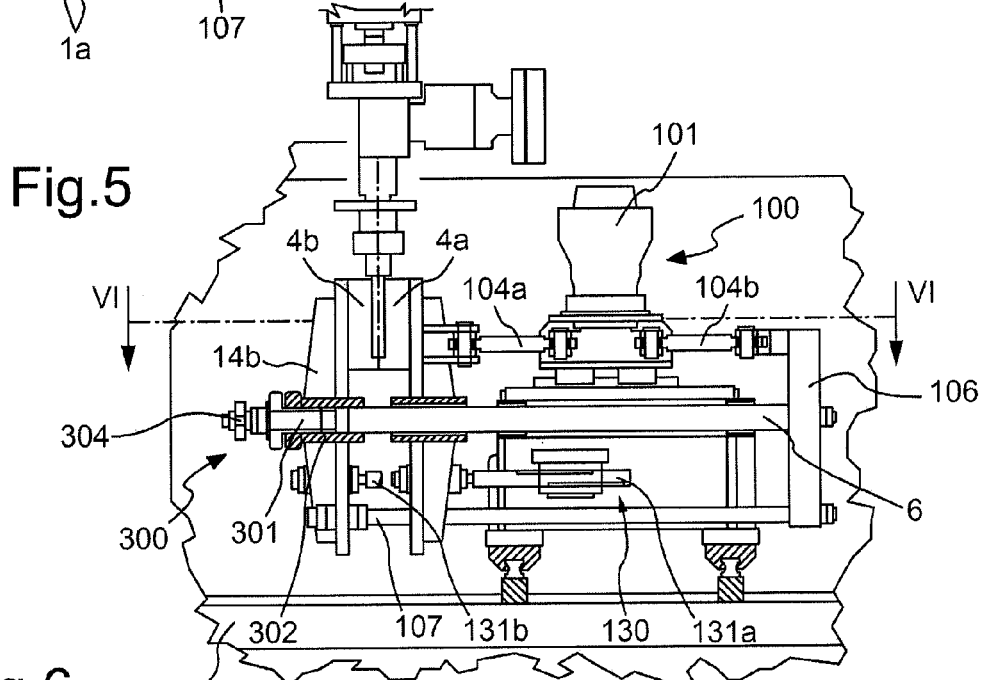
FIG. 5 shows a partially sectioned side view of the machine according to FIG. 4 with the mould closed.
Figure 6:
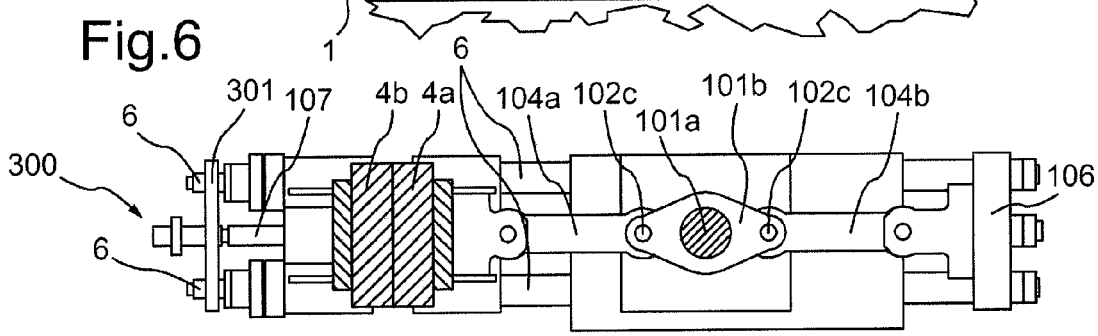
FIG. 6 shows a partial schematic cross-section through the machine along the plane indicated by the line VI-VI in FIG. 5.

As shown in greater detail in FIGS. 2-3, the first actuator 100 for moving the two half-moulds 4a,4b in the longitudinal direction X-X comprise an electric motor 101 which is arranged parallel to the axis Z-Z and on the shaft 101a of which a cam 101b (FIG. 3) is mounted, the opposite ends of said cam being connected by means of a pin 102c to the end of associated connecting rods 104a, 104b which are respectively hinged with the first half-mould 4a and a plate 106 which is in turn connected by means of the horizontal bars 6 to the second half-mould 4b so that, while the first half-mould 4a is free to move on the bars 6 owing to the arrangement in between of bushes 6a, the half-mould 4b is integral with the columns 6 and does not have a relative movement with respect thereto.

A stiffening rod 107 is also arranged between the plate 106 and the two half-moulds 4a,4b so as to ensure that the two half-moulds 4a,4b remain parallel to each other when subject to the thrusting action by the first actuator 100 and closed for the moulding operation.

A synchronization mechanism 130 is arranged between the flanges 14b,14a and is able to cause the symmetrical movement of the second half-mould 4b with respect to the first half-mould 4a and consequently the symmetrical opening/closing of the mould 4 with respect to the fixed vertical reference axis Z-Z.

The synchronization mechanism 130 comprises a first rack 131b which is integral with the flange 14b and able to engage with a gearwheel 132 which also meshes with a second rack 131a integral with the flange 14a.

With this configuration, operation of the motor 101 causes a displacement in one direction of the half-mould 4a and a displacement by the same amount, but in the opposite direction, of the half-mould 4b by means of actuation of the cam 101b and therefore the connecting rods 104a, 104b which, via the movement of the synchronization device 130, cause the displacement of the entire assembly consisting of plate 106, bars 6 and half-mould 4b support flange 14b at the same time as the displacement, in the opposite direction, of the flange 14a directly operated by the connecting rod 104a.

The second actuator 200 for displacing the mould unit in the transverse direction Y-Y (FIG. 1) consist of at least one gear motor 210, the shaft of which carries a pinion 211 able to engage with a linear rack 212 arranged parallel to the transverse axis Y-Y and fixed to one of the cross-members 1a of the structure 1 of the machine.

The machine according to the invention also includes an adjusting mechanism 300 for adjusting the distance of the two half-moulds 4a,4b with respect to the fixed axis of symmetry Z-Z.

In greater detail, the adjusting mechanism 300 comprise a plate 301 integral with the two circular guides 6 and a bushing 302 attached to said plate 301 and having a threading able to engage on the tie-rod 107 fixed to the flange 14b.

The bushing 302 has a thread with a direction opposite to that of the tie-rod so that the rotation of the bushing 302 causes the displacement in the longitudinal direction of the flange 14b which, via the synchronization device 130, causes the symmetrical displacement of the other flange 14a with consequent symmetrical positioning of the two half-moulds 4a,4b with respect to the fixed axis Z-Z.

The device also comprises a locking ring 304 for fixing the relative distance set.

With this configuration and as shown in FIGS. 2, 3, 5 and 6, the movements of the mould are performed as follows:

after adjusting via the adjusting mechanism 300 the relative distance of the two half-moulds 4a,4b from the axis Z-Z;

in a sequence coordinated and controlled by suitable programmable controller 1000;

the motor 101 is operated one direction (FIGS. 2,3) so as to cause rotation of the cam 101b in order to produce a pulling/pushing action on the flanges 14b,14a so that the said flanges are respectively pushed/pulled symmetrically away from the axis Z-Z so as to cause opening of the two half-moulds 4a,4b;

the entire mould-support unit 4 is brought underneath the extruded plastic tubes 3 by the second actuator 200;

the motor 101 is operated in the opposite direction to the previous direction so that the flanges 14b,14a are respectively pulled/pushed towards the axis of symmetry Z-Z in order to produce closing of the two half-moulds 4a,4b on the tubes 3;

the gear motor 210 is operated so that rotation of the gearing 211 on the rack 212 causes the displacement, in the transverse direction Y-Y, of the entire moulding unit underneath the blow-moulding station 5 where moulding of the containers is performed;

the first actuator 100 are again operated in order to cause opening of the two half-moulds 4a,4b;

the moulded containers 3a are removed, conveying them away by means of the associated conveyor 7; and a new cycle is started in accordance with the sequence described above.

It can therefore be seen how, as a result of transmission of the opening/closing movement of the mould by means of two in-line connecting rods, it is possible to simplify greatly the components which form the transmission system, therefore reducing the possibility of malfunctions and the occurrence of play, and also achieve a constant thrust in the centre of the half-moulds which are closed symmetrically with precise centering also in the case of multiple heads.

Owing to the presence of the rod 107 between the rear plate and the half-moulds, it also possible to improve the parallel arrangement of said components during closing.

In accordance with the invention, the gear motor 210 can be controlled by a programmable device which are schematically indicated by 1000 in FIG. 1 and which can be of the electro-mechanical, electronic and/or program processing type programmable controller.

The invention claimed is:

1. A machine for moulding containers, comprising:
   an extrusion unit for extruding plastic tubes;
   a blow-moulding unit;
   a mould, for moulding the containers, including a first half-mould and a second half-mould, the first half-mould and the second half-mould being movable in a longitudinal direction and symmetrically with respect to a fixed axis perpendicular to said longitudinal direction by a first actuator,
   the mould and the first actuator being movable in a transverse direction between a first position, substantially aligned with the extrusion unit, and a second position, substantially aligned with the blow-moulding unit, by a second actuator,
   wherein the first actuator comprises at least one motor and an associated drive shaft, the drive shaft being coupled to a cam for actuating a pair of connecting rods which are respectively connected to the first half-mould and to the second half-mould
   wherein the first half-mould is coupled to a first flange and the second half-mould is coupled to a second flange, the first flange and the second flange being mounted on a pair of first guides;
   an adjustment mechanism for adjusting the relative distance of the two half-moulds with respect to a fixed reference axis for correct closing of the first half-mould and the second half-mould;
   wherein the adjusting mechanism further includes a plate coupled to the first guides and a bushing, having a threaded portion and adapted to be attached to said plate, the plate include a threaded portion adapted to engage a tie-rod coupled to the second flange.

2. A machine according to claim 1, wherein said first guides having a circular cross-section.

3. A machine according to claim 1, wherein said first guides are connected to a support frame by a plurality of support flanges.

4. A machine according to claim 3, wherein the support flanges are coupled to second guides adapted to slide on rails fixed to the support frame.

5. A machine according to claim 1, wherein said first guides pass through bushings mounted on the first flange.

6. A machine according to claim 1, further comprising a first connecting rod directly connected to the first flange and a second connecting rod directly connected to the first flange and a second connecting rod connected to the second flange by a plate, the plate being connected to each of the first guides at a first end thereof and the second flange being connected to each of the first guides at a second end thereof.

7. A machine according to claim 1, wherein the second actuator includes a gear motor with a shaft adapted to drive a pinion gear which engages a first linear track.

8. A machine according to claim 7, wherein said first linear rack is arranged parallel to a transverse axis.

9. A machine according to claim 8, wherein said first linear rack is coupled to a support frame of the machine.

10. A machine according to claim 1 wherein the threads of the bushing and the threads of the tie-rod extend in opposite directions.

11. A machine according to claim 1, wherein the adjusting mechanism further includes a locking ring for locking the adjusting mechanism.

12. A machine according to claim 1, further comprising a programmable controller adapted for controlling the first actuator and the second actuator.

13. A machine according to claim 12, wherein the programmable controller is selected from the group including electromechanical, electronic and processing program type controllers.

14. A machine according to claim 1, further comprising a synchronization mechanism coupled to the first flange and the second flange and adapted to cause symmetrical movement of the second half-mould with respect to the first half-mould.

15. A machine according to claim 14, wherein said synchronization mechanism comprises a first rack coupled to the second flange, a second rack coupled to the second flange, wherein the first rack and the second rack are adapted to engage with a gearwheel which cause symmetrical movement of the second half-mould with respect to the first half-mould.

* * * * *